Dec. 6, 1938.   G. A. PETROE   2,138,937
VALVE MECHANISM
Filed June 11, 1936
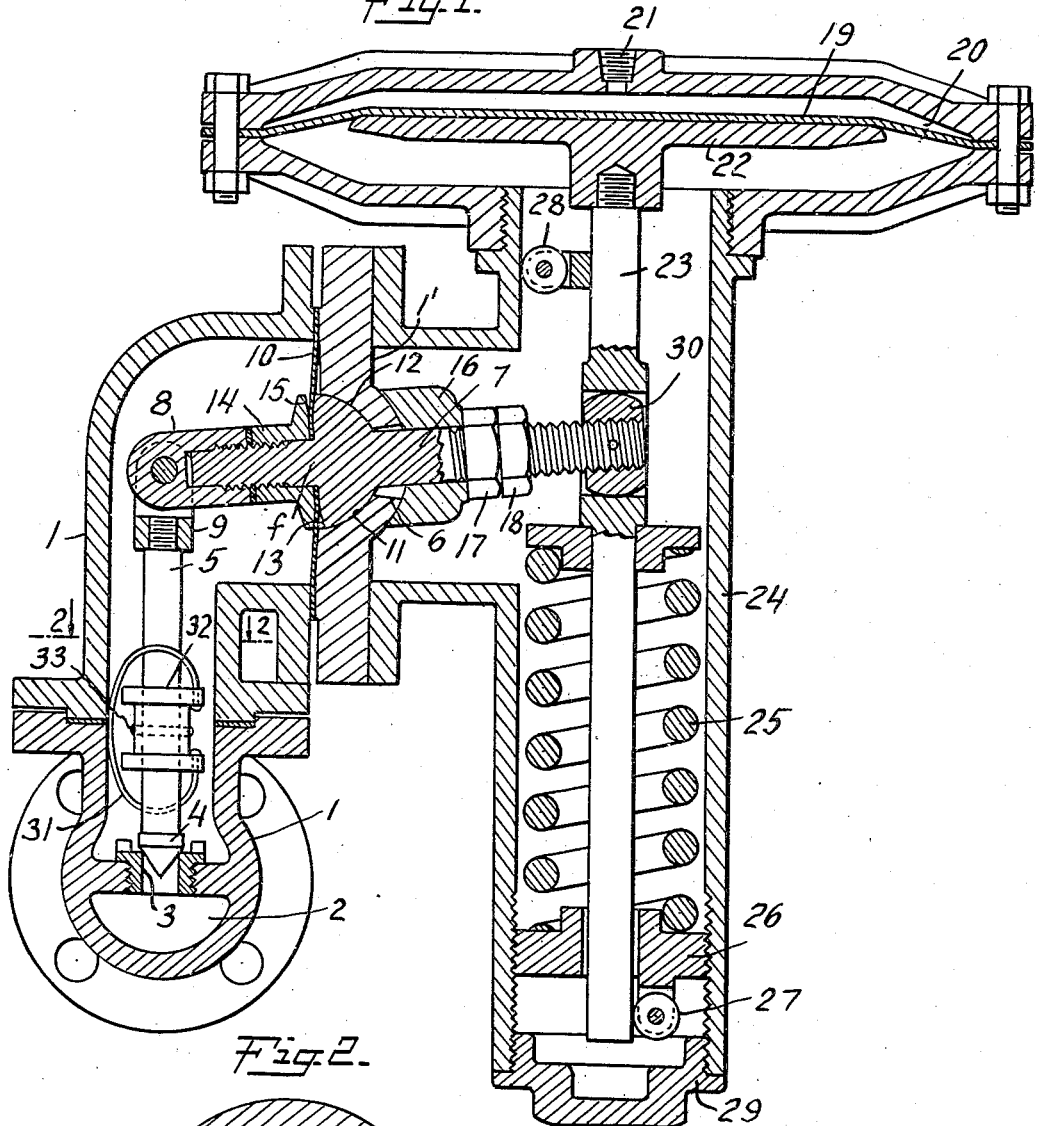
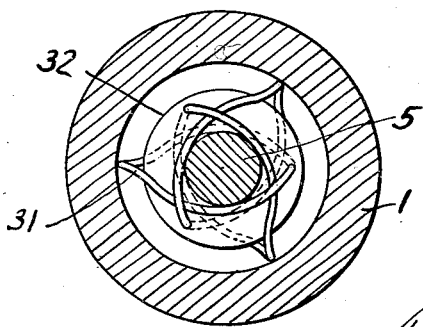
INVENTOR
Gregory A. Petroe
BY
Pennie Davis Marvin & Edmonds
ATTORNEYS Patented Dec. 6, 1938

2,138,937

UNITED STATES PATENT OFFICE 2,138,937

VALVE MECHANISM

Gregory A. Petroe, Niagara Falls, N. Y., assignor to The Mathieson Alkali Works, Inc., New York, N. Y., a corporation of Virginia Application June 11, 1936, Serial No. 84,675

4 Claims. (Cl. 74—519)

This invention relates to mechanism for actuating valves and other devices the particular object of the invention being to provide improved actuating mechanism suitable for use in apparatus for handling fluids or controlling the flow thereof.

One type of actuating mechanism heretofore employed for operating valves and for similar purposes has involved the use of a diaphragm for sealing the fluid passage or chamber from other parts of the apparatus or the atmosphere, and motion is transmitted to parts within the fluid chamber by some actuating element which performs its function by virtue of a lateral displacement of the diaphragm. In such apparatus the amount of diaphragm distortion corresponds in magnitude with the amount of motion transmitted to the operating mechanism in the sealed fluid chamber. This ordinarily involves considerable displacement of the diaphragm whenever the mechanism is actuated. The useful life of diaphragm materials used for such purposes is limited to a large extent by the amount of fluid pressure to which the diaphragm is subjected and more especially by the degree of flexure or distortion of the diaphragm. An object of this invention is to provide an improved apparatus of this type in which the parts are so constructed and arranged that the amount of flexure or distortion of the flexible diaphragm is reduced to a minimum without sacrificing the advantage of producing a relatively large mechanical displacement of the mechanism within the sealed chamber. In general, this object may be attained by employing an operating lever extending through the flexible diaphragm and firmly secured thereto at a point near the center of revolution or the fulcrum point of the lever. By employing mechanism of this character the required throw or displacement of the driven or actuated mechanism within the sealed chamber may be obtained without producing an excessive amount of flexure or displacement of the diaphragm.

A further object of my invention is to provide an improved driving or operating mechanism for actuating the lever secured to the flexible diaphragm. This actuating means is preferably a fluid pressure motor or driving device comprising a pressure chamber containing a diaphragm and a spring-pressed element associated with the diaphragm and adapted to engage one end of the lever which is associated with the diaphragm.

Another object of my invention is to provide an improved valve stem guide which insures efficient operation of the valve under all operating conditions. In general, this improved valve stem guide comprises a plurality of flexible or yielding elements carried by the valve stem and adapted to engage the wall of the valve stem housing. These yielding elements of the valve stem guide are preferably of such a nature that they make a substantially knife-edge contact with the wall of the housing enclosing the valve stem.

The various objects and advantages of my invention will be more apparent upon considering the following detailed description of a typical embodiment of the invention illustrated in the accompanying drawing in which:—

Fig. 1 is a vertical section view of a valve mechanism embodying my invention;

Fig. 2 is an enlarged transverse section view, taken on line 2—2 of Fig. 1 illustrating details of construction.

The embodiment of my invention illustrated in the accompanying drawing comprises a valve housing 1 having a fluid inlet 2, a valve seat 3 and a suitable fluid outlet (not shown) above the valve seat. A valve member 4 cooperates with the valve seat and is carried by a valve stem 5 which is movable vertically within the upper portion of the valve housing.

The valve housing has an opening 6 in one wall thereof through which extends an operating lever 7. One end of this operating lever is provided with a coupling 8 for attaching the lever to a mating coupling 9 on the upper end of the valve stem. A chain diaphragm 10 of metal or other suitable material has its marginal portion clamped between portions of the valve housing 1 and its center portion is secured to the operating lever 7.

According to my invention the center portion of the flexible diaphragm 10 is secured to the operatinng lever 7 at a point near the fulcrum point of this lever so that the center of revolution of the lever is on the center line of the diaphragm. As illustrated in Fig. 1, the wall 1' of the valve housing 1 forms a fulcrum support for the lever 7. This wall is shaped to provide a curved socket or seat 11 which may be either in the form of a ball socket or in the form of a cylinder segment. The lever 7 is provided with an annular projection having a spherical or cylindrical surface 12 of the same configuration as the spherical or cylindrical seat in the wall portion 1' of the valve housing. The center of curvature of this fulcrum seat is shown at f and this point may be regarded as the fulcrum point of the lever or the center of revolution of the lever assembly. It will be noted that this point is substantially in alignment with the flexible diaphragm 10.

The front face 13 of the annular projection on the operating lever 7 is convex in shape the radius being determined by the amount of deflection required in the diaphragm in order to support it at the point of maximum deflection. A clamping element 14 is mounted on the lever 7 and this element is provided with a convex portion 15 which radius corresponds to that of the front face 13 of lever 7. The clamping element 14 and the annular projection on the lever 7 are such that the convex surfaces 13 and 15 are opposed to each other and the clamping element 14 has a screw-threaded connection with the lever 7 so that by turning this clamping element the flat surfaces near the threaded portion of the lever 7 and at the contact points of surfaces 13 and 15 are caused to grip the center portion of the flexible diaphragm 10 with a gasket in place so as to provide a gas tight joint. The center portion of the diaphragm is thus firmly secured to the lever and the outer portions of the convex surfaces 13 and 15 permit relatively free movement of the diaphragm when the operating lever is actuated, while at the same time the diaphragm is supported on that part which is under thrust from surface 13 by surface 15 and is supported by the concave surface of the inner side of housing 1 in the direction of thrust resulting from the fluid pressures. By virtue of the fact that the diaphragm is secured to the lever near the fulcrum point the amount of distortion of the diaphragm which occurs when the lever is operating is extremely small as compared with the throw or displacement of either end of the lever.

The annular projection on the lever 7 is held against the curved seat 11 by a cap 16 engaging the outer surface of the wall portion 1' of the valve housing. This cap member 16 is held in place by nuts 17 and 18 threaded onto the outer end of the lever 7.

For actuating the valve I prefer to employ a fluid pressure motor having a flexible diaphragm 19 mounted in a pressure chamber 20. The fluid for displacing this diaphragm to actuate the valve mechanism may be admitted to the pressure chamber through a suitable inlet 21. The diaphragm 19 engages a plate 22 carried by an operating rod 23. This operating rod may be mounted within a suitable housing 24 which may also contain a coiled spring 25 which normally holds the rod 23 in its uppermost position so that the valve member 4 engages the valve seat 3 in the valve housing 1. The tension of the spring 25 may be adjusted by turning a spring seat 26 which has a screw threaded engagement with the housing 24. This spring seat 26 may be provided with a ball or anti-friction bearing 27 adapted to engage the lower end of the operating rod 23 and, if desired, a similar ball or anti-friction bearing 28 may be mounted on the upper end of the rod 23. The roller 28 engages the wall of the housing 24 to guide the movement of the upper end of the rod 23. The lower end of the housing 24 may be closed by a screw-threaded cap 29. The operating rod 23 may have an opening therein for receiving a ball member 30 mounted on the outer end of the lever 7 and it will be understood that when the diaphragm 19 is forced downward by the pressure of a fluid supplied to the pressure chamber 20 the rod 23 is forced downward against the tension of the spring 25 and this motion is transmitted to the lever 7 through the ball element 30 which engages the operating rod 23. When the fluid pressure in the pressure chamber 20 is reduced, the spring 25 then forces the rod 23 upward and the lever 7 then operates to close the valve in the valve housing 1. The flexible diaphragm 10 which serves to seal the opening in the valve housing through which the lever 7 extends is distorted to only a very small extent when the valve mechanism operates. This is due to the fact that this diaphragm is secured to the operating lever 7 near its fulcrum point and on the center of revolution of the lever.

My invention contemplates the provision of an improved valve stem guide which permits free movement of the valve stem under all operating conditions. As illustrated in the accompanying drawing this valve stem guide comprises a plurality of spring wire elements 31 bent to form loops the upper and lower extremities of which extend on opposite sides of the valve stem. This prevents accidental displacement of these elements for the valve stem holds each loop in proper position at all times. The ends of each wire loop are secured to a supporting member 32 which is shaped like a spool, the ends of the wire loops being secured to the upper and lower flanges of this spool-shaped member. The supporting member 32 is carried by the valve stem 5 and may be secured thereto by any suitable means such as a pin 33 extending through this supporting member and through the valve stem. The spring loop elements 31 form yielding guide members which engage the wall of the valve housing at a plurality of points equally spaced around the valve stem so that the valve stem is guided in its movement in such a way that it is always in alignment with the valve seat 3. I have illustrated three loops 31 (as best shown in Fig. 2) but it will be understood that additional loops may be employed if desired. My improved valve stem guide insures efficient operation of the valve at all times for the operation of the valve guide is not interfered with by any accumulated deposit on the inner wall of the valve housing. This is especially advantageous in handling a fluid which contains a gummy or sticky substance which may collect on the walls of the valve housing. The presence of such a deposit does not impair the operation of the valve guide for the yielding valve guide elements readily ride over any such deposit, the spring loops collapse to the extent necessary to permit this action.

It is to be understood that my invention is not limited to the particular embodiments thereof illustrated in the accompanying drawing but includes such modifications and adaptations thereof as fall within the scope of the appended claims. For example, while I have illustrated a mechanism in which the valve is positively operated by a diaphragm motor drive, yet for some purposes it may be desirable to have the valve driven by an electric motor, a solenoid drive or it may be driven by manual means such as a threaded rod. It is also feasible to employ my improved operating lever and diaphragm seal for purposes other than actuating a valve.

I claim:—

1. Apparatus of the type described comprising a member to be actuated, a lever, means connecting one end of said lever to said member, a housing enclosing said end of the lever, said housing having one wall thereof provided with a curved portion with a central opening therein through which said lever extends, a bearing element on said lever having a curved surface engaging the inner face of said portion of the housing wall to provide a fulcrum mounting for said lever, guiding means carried by said lever and engaging the outer face of said portion of the housing wall, and a flexible diaphragm secured to said housing and to said lever at substantially the fulcrum point thereof for forming a fluid tight seal between the interior of the housing and said fulcrum mounting.

2. Apparatus of the type described comprising a seal including a diaphragm, an operating lever for transmitting motion through said diaphragm, a fulcrum bearing for said lever, a convex diaphragm-engaging surface carried by said lever, means for clamping said diaphragm to the inner portion of said convex diaphragm-engaging surface while leaving the other portion of said diaphragm-engaging surface unattached to said diaphragm, whereby when the lever is moved about its fulcrum the convex diaphragm-engaging surface which is not attached to the diaphragm will progressively engage and support said diaphragm at the side of the axis of said operating lever opposite that which is under thrust.

3. Apparatus of the type described comprising a seal including a diaphragm, an operating lever for transmitting motion through said diaphragm, a fulcrum mounting for said lever including a bearing element having opposed convex portions, one of said convex portions forming a bearing for said lever and the other of said convex portions forming a diaphragm-engaging surface, means for clamping said diaphragm to said convex diaphragm-engaging surface at the inner portion thereof while leaving the diaphragm unattached to the outer portion thereof, whereby when said lever is moved about its fulcrum the convex diaphragm-engaging surface of said element which is not attached to the diaphragm will progressively engage and support said diaphragm at the side of the axis of said operating lever opposite that which is under thrust.

4. Apparatus of the type described comprising a seal including a diaphragm, an operating lever for transmitting motion through said diaphragm, a bearing element having opposed convex portions, one of said convex portions forming a fulcrum bearing for said lever and the other of said convex portions forming a diaphragm-engaging surface, a clamping element having a convex diaphragm-engaging surface, means for clamping said diaphragm between the convex diaphragm-engaging surfaces of said bearing and clamping elements at their inner portions while leaving the diaphragm unattached to their outer portions, whereby when said lever is moved about its fulcrum one side of said diaphragm will progressively be engaged and supported on one side of the axis of the operating lever by the convex diaphragm-engaging surface of said bearing element which is not attached to the diaphragm while on the other side of the axis of the operating lever the opposite side of the diaphragm will progressively be engaged and supported by that portion of the convex bearing surface of the clamping element which is not attached to the diaphragm.

GREGORY A. PETROE.